(12) United States Patent
Tam et al.

(10) Patent No.: US 8,384,763 B2
(45) Date of Patent: Feb. 26, 2013

(54) GENERATING A DEPTH MAP FROM A TWO-DIMENSIONAL SOURCE IMAGE FOR STEREOSCOPIC AND MULTIVIEW IMAGING

(75) Inventors: Wa James Tam, Orleans (CA); Liang Zhang, Ottawa (CA)

(73) Assignee: Her Majesty the Queen in right of Canada as represented by the Minster of Industry, Through the Communications Research Centre Canada, Ottawa (CA)

( * ) Notice: Subject to any disclaimer, the term of this patent is extended or adjusted under 35 U.S.C. 154(b) by 1593 days.

(21) Appl. No.: 11/492,128

(22) Filed: Jul. 25, 2006

(65) Prior Publication Data

US 2007/0024614 A1 Feb. 1, 2007

Related U.S. Application Data

(60) Provisional application No. 60/702,276, filed on Jul. 26, 2005.

(51) Int. Cl.
*H04N 13/00* (2006.01)

(52) U.S. Cl. ........................................................ 348/43
(58) Field of Classification Search ..................... 348/43
See application file for complete search history.

(56) References Cited

U.S. PATENT DOCUMENTS

| | | | | |
|---|---|---|---|---|
| 4,925,294 | A | 5/1990 | Geshwind et al. | 352/57 |
| 5,847,710 | A | 12/1998 | Kroitor | 345/421 |
| 6,208,348 | B1 | 3/2001 | Kaye | 345/419 |
| 6,262,743 | B1 | 7/2001 | Allio | 345/427 |
| 6,333,788 | B1 * | 12/2001 | Yamada et al. | 358/1.15 |
| 6,515,659 | B1 | 2/2003 | Kaye et al. | 345/419 |
| 6,573,940 | B1 * | 6/2003 | Yang | 348/441 |
| 6,686,926 | B1 | 2/2004 | Kaye | 345/680 |
| 6,990,681 | B2 | 1/2006 | Wang et al. | 725/105 |
| 7,015,926 | B2 | 3/2006 | Zitnick, III et al. | 345/592 |
| 7,035,451 | B2 | 4/2006 | Harman et al. | 382/154 |
| 7,054,478 | B2 | 5/2006 | Harman | 382/154 |
| 7,391,895 | B2 * | 6/2008 | Wang et al. | 382/132 |
| 7,639,838 | B2 * | 12/2009 | Nims | 382/103 |
| 2006/0020203 | A1 * | 1/2006 | Tamura | 600/437 |
| 2006/0056679 | A1 | 3/2006 | Redert et al. | 382/154 |
| 2006/0232666 | A1 * | 10/2006 | Op De Beeck et al. | 348/51 |

OTHER PUBLICATIONS

H. Spies. Gradient Channel Matrices for Orientation Estimation. Technical Report LiTH-ISY-R-2540, Dept, of Electrical Eng., Linkoping University, Linkoping, Sweden, Sep. 2003.*

K. T. Kim, M. Siegel, & J. Y. Son, "Synthesis of a high-resolution 3D stereoscopic image pair from a high-resolution monoscopic image and a low-resolution depth map," Proceedings of the SPIE: Stereoscopic Displays and Applications IX, vol. 3295A, pp. 76-86, San Jose, CA., U.S.A., 1998.

(Continued)

*Primary Examiner* — Richard Torrente
(74) *Attorney, Agent, or Firm* — Teitelbaum & MacLean; Neil Teitelbaum; Doug MacLean

(57) ABSTRACT

Depth maps are generated from a monoscopic source images and asymmetrically smoothed to a near-saturation level. Each depth map contains depth values focused on edges of local regions in the source image. Each edge is defined by a predetermined image parameter having an estimated value exceeding a predefined threshold. The depth values are based on the corresponding estimated values of the image parameter. The depth map is used to process the source image by a depth image based rendering algorithm to create at least one deviated image, which forms with the source image a set of monoscopic images. At least one stereoscopic image pair is selected from such a set for use in generating different viewpoints for multiview and stereoscopic purposes, including still and moving images.

11 Claims, 2 Drawing Sheets

OTHER PUBLICATIONS

J. Flack, P. Harman, & S. Fox, "Low bandwidth stereoscopic image encoding and transmission," Proceedings of the SPIE: Stereoscopic Displays and Virtual Reality Systems X, vol. 5006, pp. 206-214, Santa Clara, CA, USA, Jan. 2003.

C. Fehn, "A 3D-TV approach using depth-image-based rendering (DIBR)", Proceedings of Visualization, Imaging, and Image Processing (VIIP'03), pp. 482-487, Benalmadena, Spain, Sep. 2003.

C. Fehn, "Depth-image-based rendering (DIBR), compression and transmission for a new approach on 3D-TV", Proceedings of SPIE Stereoscopic Displays and Virtual Reality Systems XI, vol. 5291, pp. 93-104, CA, U.S.A., Jan. 2004.

D. Scharstein & R. A. Szeliski, "Taxonomy and evaluation of dense two-frame stereo correspondence algorithms"; International Journal of Computer Vision, vol. 47(1-3), pp. 7-42, 2002.

L. Zhang, D. Wang, & A. Vincent, "Reliability measurement of disparity estimates for intermediate view reconstruction," Proceedings of the International Conference on Image Processing (ICIP'02), vol. 3, pp. 837-840, Rochester NY, USA, Sep. 2002.

J. Ens & P. Lawrence, "An investigation of methods for determining depth from focus," IEEE Transactions on Pattern Analysis and Machine Intelligence vol. 15, pp. 97-108, 1993.

Y. Xiong & S. Shafer. "Depth from focusing and defocusing," In Proceedings of the International Conference of Computer Vision and Pattern Recognition, pp. 68-73, 1993.

S. A. Valencia & R. M. R. Dagnino, "Synthesizing stereo 3D views from focus cues in monoscopic 2D images," Proceedings of the SPIE: Stereoscopic Displays and Virtual Reality Systems X, vol. 5006, pp. 377-388, Santa Clara, CA., U.S.A., Jan. 2003.

W. J. Tam, A. Soung Yee, J. Ferreira, S. Tariq, & F. Speranza, "Stereoscopic Image Rendering Based on Depth Maps Created From Blur and Edge Information," Proceedings of the SPIE: Stereoscopic Displays and Virtual Reality Systems XII, vol. 5664, pp. 104-115, San Jose, CA, USA, Jan. 17-20, 2005.

J. Yin, & J. R. Cooperstock, "Improving depth maps by nonlinear diffusion", Short Communication Papers of the 12th International Conference on Computer Graphics, Visualization and Computer Vision, Plzen, Czech Republic, vol. 12, pp. 305-311, Feb. 2-6, 2004.

G. Alain, "Stereo vision, the illusion of depth," Co-op term report, Apr. 2003.

W. J. Tam, G. Alain, L. Zhang, T. Martin, & R. Renaud, "Smoothing depth maps for improved stereoscopic image quality," Proceedings of Three-Dimensional TV, Video and Display III (ITCOM'04), vol. 5599, pp. 162-172, Philadelphia, USA, Oct. 25-28, 2004.

L. Zhang, J. Tam, & D. Wang, "Stereoscopic image generation based on depth images," Proceedings of the IEEE Conference on Image Processing, pp. 2993-2996, Singapore, Oct. 2004.

W. J. Tam & L. Zhang, "Non-uniform smoothing of depth maps before image-based rendering," Proceedings of Three-Dimensional TV, Video and Display III (ITCOM'04), vol. 5599, pp. 173-183, Philadelphia, USA, Oct. 25-28, 2004.

L. Zhang & W. J. Tam, "Stereososcopic Image Generation based on depth images for 3D TV," IEEE Transactions on Broadcasting, 51, pp. 191-199, 2005.

W. J. Tam & L. Zhang, "3D-TV content generation: 2D-to-3D conversion." To be published in the proceedings of the International Conference on Multimedia & Expo (ICME 2006), Jul. 9-12, 2006, Toronto.

W.J. Tam, F. Speranza, L.Zhang, R. Renaud, J. Chan & C. Vazquez, "Depth Image Based Rendering for Multiview Stereoscopic Displays: Role of Information at Object Boundaries", Proceedings of Three-Dimensional TV, Video and Display IV (ITCOM'05), vol. 6016, paper No. 601609, Boston, MA, USA, Oct. 24-26, 2005.

* cited by examiner

GENERATING A DEPTH MAP FROM A TWO-DIMENSIONAL SOURCE IMAGE FOR STEREOSCOPIC AND MULTIVIEW IMAGING

CROSS-REFERENCE TO RELATED APPLICATIONS

This application claims priority from U.S. Provisional Patent Application No. 60/702,276 filed on Jul. 26, 2005, which is incorporated herein by reference for all purposes.

TECHNICAL FIELD

The present invention generally relates to depth maps generated from a monoscopic source image, for use in creating deviated images with new camera viewpoints for stereoscopic and multiview displays, and in particular to asymmetrically smoothed sparse depth maps.

BACKGROUND TO THE INVENTION

The viewing experience of visual displays and communication systems can be enhanced by incorporating multiview and stereoscopic (3D) information that heighten the perceived depth and the virtual presence of objects depicted in the visual scene. Given this desirable feature and with the maturation of digital video technologies, there has been a strong impetus to find efficient and commercially viable methods of creating, recording, transmitting, and displaying multiview and stereoscopic images and sequences. The fundamental problem of working with multiview and stereoscopic images is that multiple images are required, as opposed to a single stream of monoscopic images for standard displays. This means that multiple cameras are required during capture and that storage as well as transmission requirements are greatly increased.

In a technique called depth image based rendering (DIBR), images with new camera viewpoints are generated using information from an original source image and its corresponding depth map. These new images then can be used for 3D or multiview imaging devices. One example is the process disclosed in U.S. Pat. No. 7,015,926 by Zitnick et al for generating a two-layer, 3D representation of a digitized image from the image and its pixel disparity map.

The DIBR technique is useful for stereoscopic systems because one set of source images and their corresponding depth maps can be coded more efficiently than two streams of natural images (that are required for a stereoscopic display), thereby reducing the bandwidth required for storage and transmission. For more details on this approach, see:

K. T. Kim, M. Siegel, & J. Y. Son, "Synthesis of a high-resolution 3D stereoscopic image pair from a high-resolution monoscopic image and a low-resolution depth map," Proceedings of the SPIE: Stereoscopic Displays and Applications IX, Vol. 3295A, pp. 76-86, San Jose, Calif., U.S.A., 1998; and J. Flack, P. Harman, & S. Fox, "Low bandwidth stereoscopic image encoding and transmission," Proceedings of the SPIE: Stereoscopic Displays and Virtual Reality Systems X, Vol. 5006, pp. 206-214, Santa Clara, Calif., USA, January 2003.

Furthermore, based on information from the depth maps, DIBR permits the creation of not only one novel image but also a set of images as if they were captured with a camera from a range of viewpoints. This feature is particularly suited for multiview stereoscopic displays where several views are required.

A major problem with conventional DIBR is the difficulty in generating the depth maps with adequate accuracy, without a need for much manual input and adjustments, or without much computational cost. An example of this is the method disclosed by Redert et al in U.S. Patent Application 2006/0056679 for creating a pixel dense full depth map from a 3-D scene, by using both depth values and derivatives of depth values. Another problem arises with such dense depth maps for motion picture applications, where the depth map is too dense to allow adequately fast frame-to-frame processing.

There are software methods to generate depth maps from pairs of stereoscopic images as described in:

D. Scharstein & R. A. Szeliski, "Taxonomy and evaluation of dense two-frame stereo correspondence algorithms", International Journal of Computer Vision, Vol. 47(1-3), pp. 7-42, 2002; and L. Zhang, D. Wang, & A. Vincent, "Reliability measurement of disparity estimates for intermediate view reconstruction," Proceedings of the International Conference on Image Processing (ICIP'02), Vol. 3, pp. 837-840, Rochester N.Y., USA, September 2002.

However, the resulting depth maps are likely to contain undesirable blocky artifacts, depth instabilities, and inaccuracies, because the problem of finding matching features in a pair of stereoscopic images is a difficult problem to solve. For example, usually these software methods assume that the cameras used to capture the stereoscopic images are parallel.

To ensure reasonable accuracy of the depth maps would typically require (a) appreciable amount of human intervention and steady input, (b) extensive computation, and/or (c) specialized hardware with restrictive image capture conditions. For example, Harman et al describe in U.S. Pat. Nos. 7,035,451 and 7,054,478 two respective methods for producing a depth map for use in the conversion of 2D images into 3D images from an image. These examples involve intensive human intervention to select areas within key frames and then tag them with an arbitrary depth or to apply image pixel repositioning and depth contouring effects.

Two approaches have been attempted for extracting depth from the level of sharpness based on "depth from focus" and "depth from defocus". In "depth from focus," depth information in the visual scene is obtained from only a single image by modeling the effect that a camera's focal parameters have on the image, as described in J. Ens & P. Lawrence, "An investigation of methods for determining depth from focus," IEEE Transactions on Pattern Analysis and Machine Intelligence Vol. 15, pp. 97-108, 1993.

In "depth from defocus," depth information is obtained based on the blur information contained in two or more images that have been captured with different camera focal or aperture settings from the same camera viewpoint, i.e., location, as described in Y. Xiong & S. Shafer. "Depth from focusing and defocusing," In Proceedings of the International Conference of Computer Vision and Pattern Recognition, pp. 68-73, 1993.

In both cases, camera parameters are required to help convert the blur to the depth dimension.

Others have attempted to generate depth maps from blur without knowledge of camera parameters by assuming a general monotonic relationship between blur and distance and arbitrarily setting the minimum and maximum ranges of depth as described in:

S. A. Valencia & R. M. R. Dagnino, "Synthesizing stereo 3D views from focus cues in monoscopic 2D images," Proceedings of the SPIE: Stereoscopic Displays and Virtual Reality Systems X, Vol. 5006, pp. 377-388, Santa Clara, Calif., U.S.A., January 2003.

However, the main problem with these attempts is that depth within object boundaries is still difficult to determine and, for the described methods, attempts are made to fill the regions which tend to be inaccurate, as well as computationally complex and intensive.

Another major problem with DIBR concerns the rendering of newly exposed regions that occur at the edges of objects where the background was previously hidden from view, and no information is available in depth maps on how to properly fill in these exposed regions or "holes" in the rendered images. Although not perfect, a common method is to fill these regions with the weighted average of luminance and chrominance values of neighboring pixels. However, this solution often leads to visible distortions or annoying artifacts at edges of objects. In general, there is a consensus in prior art against smoothing to reduce such distortions, especially smoothing across object boundaries with sharp depth transitions, as this has been presumed to reduce the depth between the object and its background. See for example:

J. Yin, & J. R. Cooperstock, "Improving depth maps by non-linear diffusion", Short Communication Papers of the 12th International Conference on Computer Graphics, Visualization and Computer Vision, Plzen, Czech Republic, Vol. 12, pp. 305-311, Feb. 2-6, 2004.

Contrary to this consensus, we have provided empirical evidence of an ameliorative effect of a rather simple 'uniform' smoothing of depth maps, including smoothing across object boundaries, on image quality as given in our report:

G. Alain, "Stereo vision, the illusion of depth," Co-op term report, April 2003.

This was subsequently confirmed in a published suggestion in the following two publications by Fehn to use 2D uniform Gaussian smoothing of depth maps at object boundaries:

C. Fehn, "A 3D-TV approach using depth-image-based rendering (DIBR)", Proceedings of Visualization, Imaging, and Image Processing (VIIP'03), pp. 482-487, Benalmadena, Spain, September 2003; and C. Fehn, "Depth-image-based rendering (DIBR), compression and transmission for a new approach on 3D-TV", Proceedings of SPIE Stereoscopic Displays and Virtual Reality Systems XI, Vol. 5291, pp. 93-104, CA, U.S.A., January 2004.

More recently, however, we found that uniform smoothing of depth maps causes undesirable geometrical distortion in the newly exposed regions as further described below.

Another limitation of conventional methods in DIBR, in general, is likely to occur when applied to motion pictures entailing a sequence of image frames. Any sharp frame-to-frame transitions in depth within a conventional depth map, often result in misalignment of a given edge depth between frames thereby producing jerkiness when the frames are viewed as a video sequence.

Based on the above described shortcoming is prior art, there is clearly a need for an affordably simple solution for deriving sparse depth maps from a single 2D source image without requiring knowledge of camera parameters, to meet the purpose of creating with DIBR higher quality virtual 3D images having negligible distortions and annoying artifacts, and minimized frame-to-frame jerkiness in motion pictures, particularly at object boundaries.

SUMMARY OF THE INVENTION

Accordingly, the present invention relates to a method for generating a smoothed sparse depth map from a monoscopic source image, for use in creating at least one stereoscopic image pairs with a relatively higher quality.

In a first aspect, the present invention provides a method for generating a depth map from a monoscopic source image, comprising the steps of:
(a) identifying a subset of the array of pixels representing an edge of at least one local region of the source image, the edge being defined by a predetermined image parameter having an estimated value exceeding a predefined threshold; and
(b) assigning to each pixel within said subset, a depth value based on the corresponding estimated value of the image parameter;
(c) smoothing the depth map to a near-saturation level, so selected as to minimize dis-occluded regions around each edge;
(d) using a depth image based rendering (DIBR) algorithm to create a plurality of deviated images by processing the source image based on the depth map; and
(e) selecting from the source image and the plurality of deviated images more than one stereoscopic image pairs, so as to give an impression of being captured from different camera positions.

Optionally, step (a) is performed by the steps of:
   determining from a finite set of scales a minimum reliable scale; and
   estimating gradient magnitude for each pixel of the source image by using the minimum reliable scale;
and step (b) is performed by the steps of:
   recording the estimated gradient magnitude as the depth value;
   partitioning total area of the depth map into a plurality of windows of a predetermined size; and
   filling the depth map in regions with missing depth values, by inserting maximum depth values within each window Alternatively, step (a) is performed by applying a Sobel operator to the source image to detect the location of the edge, the operator having a suitably selected input threshold value, such as selected from the range of 0.04 to 0.10 to obtain a binary depth value distribution for use by step (b), the input threshold selected from an empirically pre-determined range so as to make the depth map lie between being too barren and too finely textured;
and step (b) is performed by the steps of:
   amplifying the binary depth value distribution by a predetermined factor; and
   expanding spatial location of each depth value by a predetermined number of pixels to increase width of the identified subset of the array of pixels representing the edge.

Preferably, step (c) uses a 2D Gaussian filter defined by a pair of parameter values for window size and standard deviation so chosen for both the horizontal and vertical orientations as to determine a type of smoothing selected from the group consisting of:
   i) uniform smoothing, wherein each of the parameter values is similar in the horizontal and vertical orientations;
   ii) asymmetrical smoothing, wherein each of the parameter values is substantially larger in the vertical than in the horizontal orientation; and
   iii) adaptive smoothing, wherein each of the parameter values follows a respective predefined function of the depth values.

The DIBR algorithm typically performs the steps of:
   selecting a value for zero-parallax setting (ZPS) between nearest and farthest clipping planes of the depth map, so selected as to meet viewing preferences;
   providing a depth range value and a corresponding focal length for the 3D image; and
   filling each residual vacant spot, by using an average of all neighboring pixels In another aspect, the present invention provides a method for generating a smoothed depth map for a monoscopic source image, comprising the steps of:

(a) deriving a depth map from the monoscopic source image; and (b) smoothing the depth map to a near-saturation level around an area corresponding to at least one local region of the source image defined by a change in depth exceeding a predefined threshold, so as to minimize dis-occluded regions around each edge, wherein range and strength of smoothing are substantially higher in the vertical than the horizontal orientation.

In a further aspect, the present invention provides a system for generating a stereoscopic view from a monoscopic source image, the system comprising a tandem chain of:

an edge analyzer for receiving the source image and deriving a depth map therefrom, the depth map containing depth values of at least one edge of a local region of the source image, the edge being defined by a predetermined image parameter having an estimated value exceeding a predefined threshold, wherein each depth value is based on the corresponding estimated value of the image parameter;

an asymmetric smoother, for smoothing the depth map to a near-saturation level;

a DIBR processor for processing the source image based on the depth map to render at least one deviated image to form with the source image at least one stereoscopic image pair a 3D display for generating at least one stereoscopic view from the at least one stereoscopic image pair.

In yet another aspect, the present invention provides a system for generating a 3D motion picture from a sequence of monoscopic source images, the system comprising a tandem chain of:

an edge analyzer for receiving each source image and deriving a corresponding depth map therefrom;

a DIBR processor for processing each source image with the corresponding depth map to render at least one corresponding deviated image forming with the source image at least one stereoscopic image pair; and a 3D display device for sequentially generating at least one stereoscopic view from each rendered stereoscopic image pair.

A major advantage of the system and methods provided by this invention is that they address both issues of depth map generation and depth-image-based rendering (DIBR) without annoying artifacts at object boundaries. In this respect, the invention provides methods for generating a novel type of depth maps containing sparse information concentrated at edges and boundaries of objects within the source image, to serve the purpose of savings in bandwidth requirements for either storage or transmission. This is in contrast with conventional depth maps containing dense information about the absolute or relative depth of objects of a given image with no particular emphasis on edges and boundaries of objects.

BRIEF DESCRIPTION OF THE DRAWINGS

The invention will be described in greater detail with reference to the accompanying drawings which represent exemplary embodiments thereof, in which same reference numerals designate similar parts throughout the figures thereof, wherein.

DETAILED DESCRIPTION

Reference herein to any embodiment means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

In context of the present invention, the following general definitions apply. A source image is a picture, typically digital and two-dimensional planar, containing an image of a scene complete with visual characteristics and information that are observed with one eye, such as luminance intensity, shape, colour, texture, etc.

A depth map is a two-dimensional array of pixels (or blocks of pixels) each being assigned a depth value indicating the relative or absolute depth of the part of objects in the scene, depicted by the pixel (or block) from an image capturing device.

Figure 1:
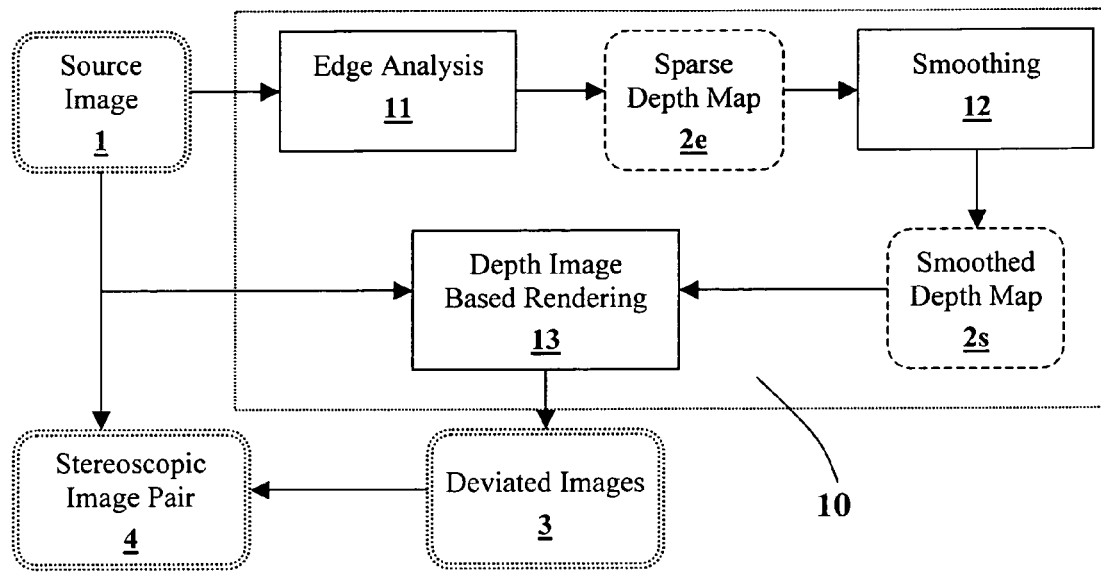
FIG. 1 illustrates in a flow chart a method for generating a sparse depth map from a 2D source image and using the generated depth map in creating a deviated image to form with the source image a stereoscopic image pair, in accordance with an embodiment of the present invention.

With reference to FIG. 1, the present invention addresses prior art limitations by providing a method 10 for generating a smoothed depth map 2s from a monoscopic (2D) source image 1 to be used in processing the source image 1 to create at least one deviated image 3 with a different camera viewpoint from the source image 1.

The method 10 includes an edge analysis process 11 for generating a sparse depth map 2p wherein the array of pixels is concentrated at edges and object boundaries of local regions, while disregarding all other regions where no edge is detected. The depth value assigned to each pixel in such array indicates the depth of the corresponding edge. The sparse depth map 2p is treated by a smoothing process 12 to smooth any sharp changes in depth at borders and object boundaries to near-saturation levels, thereby obtaining a smoothed depth map 2s. The source image 1 is then combined with the smoothed depth map 2s by a depth image based rendering (DIBR) algorithm 13 to create the deviated image 3. The DIBR algorithm 13 generates at least one deviated image 3 based on the source image 1 and smoothed depth map 2s, such that the viewpoint of the deviated image 3 is different from the source image 1. The deviated image 3 together with the source image 1 forms a stereoscopic image pair 4, for use in stereoscopic imaging.

In embodiments, where more than one deviated image 3 is created by the DIBR algorithm 13, the source image 1 and the deviated images 3 together form a set of monoscopic images, such that more than one stereoscopic image pairs 4 is selected from such a set. The selected stereoscopic image pairs 4 are then used in generating different viewpoints with varying degrees of deviation in camera viewpoints from the source image 1 for multiview and stereoscopic purposes, including still and moving images. Of course, the farther the camera viewpoint from the original the more rendering artefacts there will be.

It is to be noted that within the context of this embodiment, there are two types of edges of the local region defined by two different image parameters as follows:

(a) the image parameter being a transition in depth, and
(b) the image parameter being simply a transition in luminance/contrast/texture/color but without an actual transition in depth.

Typically, the sparse depth map 2p is based on type (a), but the present embodiment is applicable to both types. According to our experimental evidence so far, there appears to be no loss in depth/image quality as a result of treating the two types in a similar way.

It is a well known observation that the human visual system attempts to arrive at a final perception of depth even when a given depth map used in DIBR is not complete. This is done by combining all available information in terms of multiple monoscopic cues to depth and surface interpolation in natural images to fill in regions between boundaries or within sparse disparate entities. The present invention takes advantage of such observation by requiring only the original source image 1 for generating the depth map 2p.

As well, there is evidence that the human visual system is able to carry out surface and boundary completion, presumably by integrating horizontal disparity information with other 2D depth cues. In line with this, we have experimentally found that a depth map containing depth values at object boundaries does not necessarily have to be as veridical as commonly practiced in prior art. This means that a mere localization of object boundaries (e.g., using a non-zero value at each of the pixel locations that make up the edge/boundary, and a value of zero elsewhere) will be sufficient for creating an appreciable stereoscopic depth quality in a 3D view generated from the stereoscopic image pair 4, as contrasted to the 2D source image 1.

Another departure of the present invention from prior art is the use of the near-saturation smoothing process 12. Unlike what has been previously taught we empirically observed that such smoothing process 12 led to improvement in quality of rendered stereoscopic images over those rendered by unsmoothed depth maps. We observed that such smoothing reduced the effects of blocky artifacts and other distortions that are otherwise found especially in raw (unprocessed) depth maps that have been generated from block-based methods. Importantly, we found that smoothing of depth maps before DIBR resulted in a reduced impairments and/or rendering artifacts in dis-occluded regions at object boundaries of the rendered image. This, in effect, improves the quality of the stereoscopic images created from either the source image 1 plus the rendered deviated image 3 forming the stereoscopic image pair 4, or from the rendered deviated images 3 of both the left-eye and the right-eye view that form the stereoscopic image pair 4.

More particularly, the smoothed depth map 2s exhibited a reduction in the rendered images from the DIBR algorithm 13 in:

(a) the number and size of newly exposed (dis-occlusion) regions where potential texture artefacts caused by the hole-filling interpolation process of image warping through a DIBR algorithm 13; and
(b) geometrical distortion in the newly exposed regions caused by uniform smoothing of the sparse depth map 2p.

Furthermore, we found the smoothing process 12 to be effective for improving the quality of the deviated image 3 irrespective of which process is used to generate a depth map, hence making the smoothing process 12 applicable to various types of depth maps other than the sparse depth map 2p generated herewith. Our anecdotal evidence also indicates that smoothing process can help reduce the perception of an undesirable cardboard effect (which is indicated when objects look like they are at different depths but the objects look flat themselves) because object boundaries are smoothed.

For a further description of our experimental findings and additional details relevant to the present invention, see the following articles co-authored by the inventors, which are incorporated herein by reference:

W. J. Tam, G. Alain, L. Zhang, T. Martin, & R. Renaud, "Smoothing depth maps for improved stereoscopic image quality," Proceedings of Three-Dimensional TV, Video and Display III (ITCOM'04), Vol. 5599, pp. 162-172, Philadelphia, USA, Oct. 25-28, 2004;

L. Zhang, J. Tam, & D. Wang, "Stereoscopic image generation based on depth images," Proceedings of the IEEE Conference on Image Processing, pp. 2993-2996, Singapore, October 2004.

W. J. Tam & L. Zhang, "Non-uniform smoothing of depth maps before image-based rendering," Proceedings of Three-Dimensional TV, Video and Display III (ITCOM'04), Vol. 5599, pp. 173-183, Philadelphia, USA, Oct. 25-28, 2004;

L. Zhang & W. J. Tam, "Steresoscopic Image Generation based on depth images for 3D TV," IEEE Transactions on Broadcasting, 51, pp. 191-199, 2005;

W. J. Tam & L. Zhang, "3D-TV content generation: 2D-to-3D conversion." To be published in the proceedings of the International Conference on Multimedia & Expo (ICME 2006), 9-12 Jul. 2006, Toronto; and W. J. Tam, F. Speranza, L. Zhang, R. Renaud, J. Chan, & C. Vazquez, "Depth image based rendering for multiview stereoscopic displays: Role of information at object boundaries." Proceedings of Three-Dimensional TV, Video and Display IV (ITCOM'05), Vol. 6016, paper No. 601609, Boston, Mass., USA, Oct. 24-26, 2005.

Several alternative approaches, as described below, are available for implementing the edge analysis process 11.

I. One approach for the edge analysis process 11 is based on estimating levels of blur (opposite to sharpness) at local regions in the monoscopic source image 1, and uses the principle that edges and lines are considered blurred if they are thick and sharp if they are thin. This approach assumes that, for a given camera focal length, the distance of an object from the camera is directly related to the level of blur (or sharpness) of the picture of that object in the source image 1. In other words, an object placed at a specific position that produces a sharp picture in the image plane will produce a blurred picture if the same object is located farther away from that specific position. Accordingly, the level of blur can be estimated by applying an algorithm that determines the best local scale (window size) to use for the detection of edges in the source image 1. Such an algorithm is performed in two steps as follows.

In a first step, the minimum reliable scale $\Phi_1$, to estimate gradient magnitude (such as the gradual decrease or increase in luminance at blurred edges) for each pixel of the source image 1, is determined from a finite set of scales so as to reduce the number of computations. Once $\Phi_1$ is found, the estimated gradient magnitude is recorded as the depth value in the depth map 2p. More specifically, the first step includes the following operations:

(1a) Constructing a Gaussian first derivative basis filters for a set of the minimum reliable scales $\Phi_1$: [16, 8, 4, 2, 1, 0.5];

(1b) Processing the image pixels in the source image 1 by convolution, which involves systematically processing one of the local regions and then shifting to the next local region centered around the next pixel (or block of pixels), using the first scale in the $\Phi_1$ set, such that a convolution magnitude is set as the depth value when being larger than a critical value empirically determined a priori based on a sample set of images. Otherwise, the magnitude is set to 0 and step (1b) is reiterated with the next $\Phi_1$ scale; and (1c) Adjusting the range of depth values to lie within a given range such as [0-255].

In a second step, the sparse depth map 2p obtained from the first step (which is likely to be relatively thin) is expanded to neighboring local regions with missing depth values by partitioning the total area of the depth map 2p into a number of windows of M×N pixels, and calculating the maximum depth value within each window. A typical window size has M=N=9 pixels. The pixels that have missing depth values are assigned the maximum depth value. More specifically, the second step includes the following operations for each window:

(2a) Retrieving the depth values;

(2b) Determining the maximum depth value; and (2c) Scanning each pixel, such as to replace the depth value with the maximum depth value when being 0 for a given pixel;

The second step is repeated for the next adjacent window until the entire area of the source image 1 is covered.

II. Alternatively, the depth map 2p is generated from the source image 1 by estimating location of the edges and object boundaries using edge/line detecting techniques, such as the use of Sobel operator. Applying the Sobel operator to the source image 1 results in the detection of the location of boundaries and edges that depends largely on what input threshold is selected for the Sobel operator; the larger the threshold the more suppression of spurious lines and edges, and vice versa. A "best" threshold is therefore selected such that the depth map 2p will lie between being too barren and too finely textured. For example using a threshold range of 0.04 to 0.10 with the Sobel operator is found to result in a binary value of 1 where a line was detected, and 0 elsewhere. The resulting binary distribution, showing object outlines, is then amplified by 255 ($2^8-1$) and expanded by n pixels (typically n=4) in the horizontal orientation to increase the width of the detected edges and boundaries.

III. A further alternative to generating the depth map 2p is based on estimating the luminance intensity distribution at each local region, by determining the standard deviation of luminance values within the local regions, as further detailed in the following article co-authored by the inventors, which is incorporated herein by reference:

W. J. Tam, G. Alain, L. Zhang, T. Martin, & R. Renaud, "Smoothing depth maps for improved stereoscopic image quality," Proceedings of Three-Dimensional TV, Video and Display III (ITCOM'04), Vol. 5599, pp. 162-172, Philadelphia, USA, Oct. 25-28, 2004.

Subsequent to the edge analysis process 11, the depth map 2p is then treated by the smoothing process 12 using a 2D Gaussian filter g(x, $\Phi$) defined by $$g(x, \sigma) = \frac{1}{\sqrt{2\pi}\,\sigma}\exp\left\{-\frac{x^2}{\sigma^2}\right\}, \text{ for} \qquad (1)$$
$$-w \le x \le w,$$

where w is the filter's width (window size), which determines the range (spatial extent) of depth smoothing at the local region, and $\sigma$ is the standard deviation, which determines the strength of depth smoothing. Let s(xy) be a depth value at pixel (x,y), then, a smoothed depth value ŝ(xy) is obtained from the Gaussian filter to be equal to $$\frac{\sum_{v=-w}^{w}\left\{\sum_{\mu=-w}^{w}(s(x-\mu, y-v)g(\mu, \sigma_\mu))g(v, \sigma_v)\right\}}{\sum_{v=-w}^{w}\left\{\sum_{\mu=-w}^{w}(g(\mu, \sigma_\mu))g(v, \sigma_v)\right\}} \qquad (2)$$

As reported in the above cited articles co-authored by the inventors, we found that the newly exposed portion of the total image area for a sample test image progressively decreased with depth smoothing strength and approached a minimum value when depth smoothing strength reaches a near-saturation level. For near-saturation smoothing, exemplary paired filter parameter values for w and $\sigma$ are given in Table I.

Different parameter values are found to have different impact on the image quality of the deviated image 3 created from the source image 1. Therefore, it is possible to manipulate the extent and type of smoothing by changing the parameter values for both horizontal and vertical orientations, as follows.

i) Uniform smoothing, wherein each of the parameter values is similar in the horizontal and vertical orientations.

ii) Asymmetrical smoothing, wherein each of the parameter values is substantially different between the vertical and horizontal orientations. It is to be noted that filtering done in the horizontal and vertical orientations is performed by two independent processes. We discovered that larger parameter values in the vertical than in the horizontal orientation provide a better rendered 3D image quality by getting rid of geometric distortions that arise from rendering of object boundaries especially where there are vertical lines or edges. This is by virtue of the fact that the human visual system is more attuned to horizontal disparities than vertical disparities (i.e., the two eyes are positioned in the horizontal plane). Table I gives exemplary filter parameter values which are three times larger in the vertical than the horizontal orientation.

iii) Adaptive smoothing, wherein each of the parameter values follows a respective predefined function of the depth values at x, y locations in the depth map 2p. The minimum and maximum values of $\sigma$ represent the smallest and the largest values used in the smoothing process that are associated with the grey-scale intensity values of the depth map 2p, with linear interpolation for the grey-scale values falling between the two extremes. As an example of a typical embodiment, the standard deviation $\sigma$ in the vertical orientation is set to be around three times that in the horizontal orientation, and the filter window size w is set to be around $3\sigma$, in order to improve image quality while having a minimal impact on depth quality.

Examples of the parameter values adopted for the above three smoothing methods are summarized in Table I.

Figure 2:
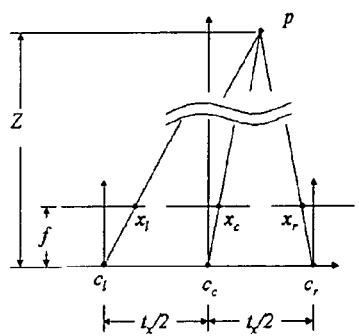
FIG. 2 shows the geometry in a commonly used configuration of using three cameras for generating virtual stereoscopic images from one center image associated with one depth map for 3D TV.

Following the smoothing process 12, the resulting smoothed depth map 2s is used by the DIBR algorithm 13 to create the deviated image 3. For simplicity, we only consider a commonly used camera configuration for generating virtual stereoscopic images from one center image associated with one depth map for 3D television. In this case, the vertical coordinate of the projection of any 3D point on each image plane of three cameras is the same. With reference to FIG. 2, let $c_c$ be the viewpoint of the original center image, $c_l$ and $c_r$ be the respective viewpoints of the virtual left-eye and right-eye images to be generated, and $t_x$ be the distance between these two virtual cameras. Under such camera configuration, one point p with a depth Z is projected onto the image plane of three cameras at pixel $(x_l, y)$, $(x_c, y)$ and $(x_r, y)$, respectively. From the geometry shown in FIG. 2, we have $$x_l = x_c + \frac{t_x}{2}\frac{f}{Z},$$

$$x_r = x_c - \frac{t_x}{2}\frac{f}{Z},$$

(3)

where information about $x_c$ and $f/Z$ is given in the center image and the associated depth map, respectively. Therefore, with formulation (3) for 3D image warping, the virtual left-eye and right-eye images are possible to generate from the source image 1 and the corresponding depth map 2p by providing the value of $t_x$.

Accordingly, the DIBR algorithm 13 consists of three steps:
(a) Setting the convergence distance of a virtual camera configuration (so-called zero-parallax setting or ZPS), as further detailed below;
(b) 3D image "warping" by providing depth range value in the deviated image 3 and the corresponding focal length; and
(c) Filling any residual vacant spots as necessary, by using the average of all neighboring pixels.
The ZPS is chosen to be between the nearest clipping plane and the farthest clipping plane of the depth map, based on viewing preference of depth range in front of a display screen. As an example, the depth map 2p is represented as an 8-bit map, and the nearest clipping plane is set to be 255 and the farthest clipping plane is set to zero. Thus, ZPS is equal to 127.5. This ZPS value is then subtracted from each of the grey intensity values in the depth map 2p and then normalized to lie between 0 and 255. After that, the depth values in the depth map 2p are further normalized to be within the interval [−0.5, 0.5] as required by step (b) above.

Figure 3:
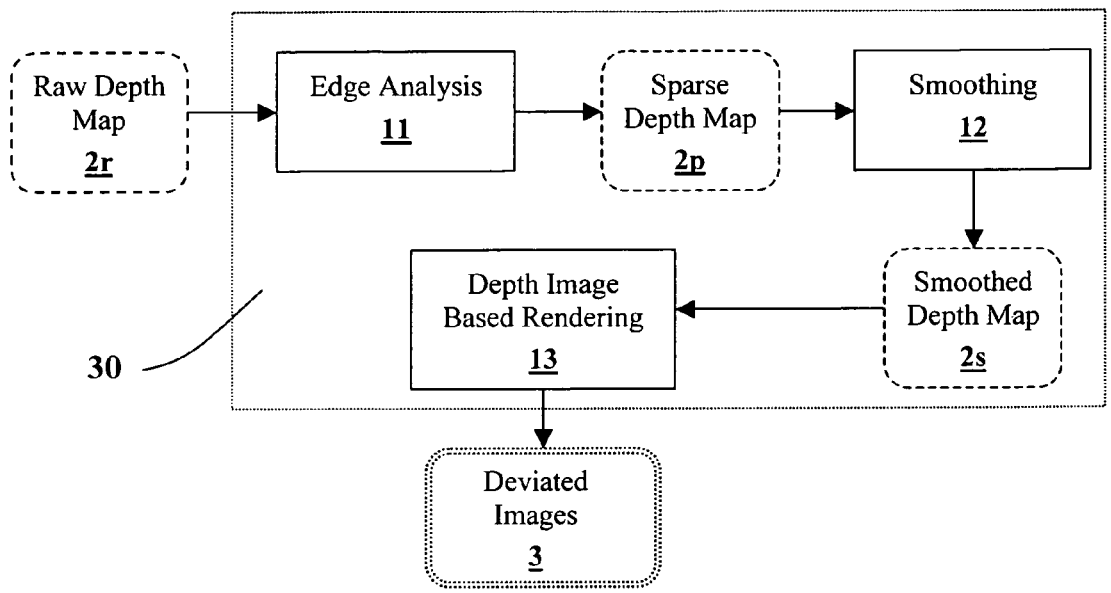
FIG. 3 illustrates in a flow chart a method for creating a deviated image using sparse depth map derived from a raw depth map in accordance with another embodiment of the present invention.

Another embodiment of the present invention is illustrated by FIG. 3, which shows another method 30 for creating deviated images 3 using the sparse depth map 2p, which generated from a raw depth map 2r. The other method 30 shown in FIG. 3 performs similar functions to those performed by the method 10 shown in FIG. 1 and described above, with an exception that the raw depth map 2r is used as a source for generating the sparse depth map 2p instead of using the source image 1. It is also possible to simplify the embodiments shown in FIGS. 1 and 3 without deviating from the spirit of the present invention, by removing the smoothing process 12.

Figure 4:
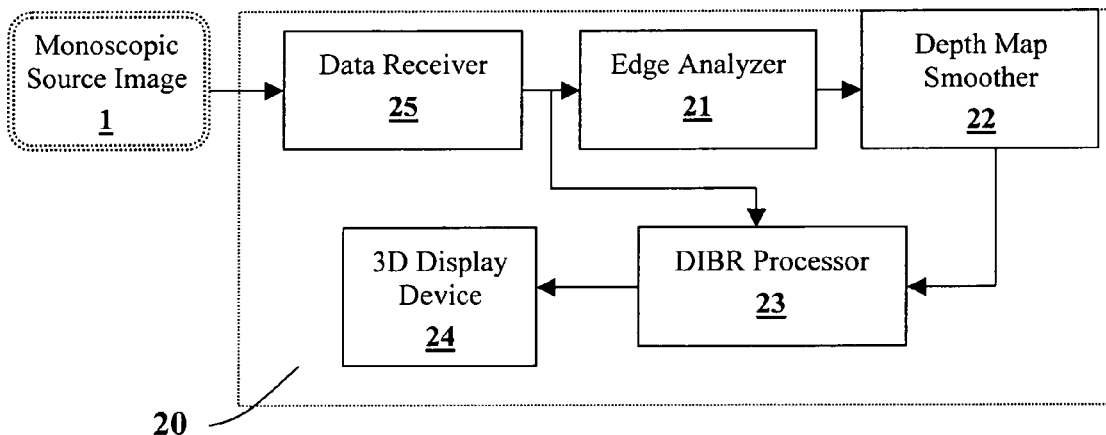
FIG. 4 illustrates in a block diagram a system for generating stereoscopic views on a 3D display device, based on a stream of 2D source images, in accordance with yet another embodiment of the present invention.

Yet another embodiment of the present invention is illustrated by FIG. 4, which shows a system 20 for generating a stereoscopic view of the source image 1 on a 3D display device 24. The source image 1 is received from a transmission medium and decoded by a data receiver 25, and then fed to a tandem chain of an edge analyzer 21, followed by a depth map smoother 22, and then a DIBR processor 23. The received source image 1 is also fed to the DIBR processor 23. The outcome of the DIBR processor 23 is then provided to the 3D display device 24 for providing the stereoscopic view. The edge analyzer 21, the depth map smoother 22, and the DIBR processor 23 respectively perform similar functions to those described above for the edge analysis process 11, the smoothing process 12, and the DIBR algorithm 13, all shown in FIG. 1.

The embodiment of FIG. 4 is suitable for various applications showing still or moving images, such as:
(a) multiview autostereoscopic displays;
(b) 3D videoconferencing;
(c) 3D television; and
(d) sequences of image frames for motion pictures.

In multiview displays, multiple views and stereoscopic pairs are generated from a received 2D television images. Multiview images are rendered images that give an impression that they were captured from camera positions different from the original camera position.

For sequences of images, the near-saturation smoothing performed by the depth map smoother 22 helps minimize any perceived jerkiness that would otherwise arise between frames from the DIBR processor 23 when not being preceded by edge-smoothing. This is because such depth map smoothing results in a spreading of the depth (as contrasted to a sharp change in depth), such that the edges are not as precisely localized depth-wise.

The above-described embodiments are intended to be examples of the present invention. Numerous variations, modifications, and adaptations may be made to the particular embodiments by those of skill in the art, without departing from the spirit and scope of the invention, which are defined solely by the claims appended hereto.

TABLE I

| Level of Smoothing | Uniform Smoothing | Asymmetric Smoothing | Adaptive Smoothing |
|---|---|---|---|
| None | $\sigma = 0$<br>$w = 0$ | $\sigma = 0, w = 0$ | $\sigma = 0, w = 0$ |
| Mild | $\sigma = 4$<br>$w = 13$ | Horizontal: $\sigma = 4, = w\ 13$<br>Vertical: $\sigma = 12, w = 37$ | Horizontal $\sigma = 2$ to 4<br>Vertical $\sigma = 3 \times$ Horizontal $\sigma$<br>$w = 3\sigma$ for both orientations |
| Strong | $\sigma = 20$<br>$w = 61$ | Horizontal: $\sigma = 20, w = 61$<br>Vertical: $\sigma = 60, w = 181$ | Horizontal $\sigma = 10$ to 20<br>Vertical $\sigma = 3 \times$ Horizontal $\sigma$<br>$w = 3\sigma$ for both orientations | w = filter's window size,
σ = standard deviation.

We claim:

1. A method for generating a depth map containing an array of pixels, from a monoscopic source image using a computer system comprising a data receiver and an edge analyzer, the method comprising:
   (a) using the edge analyzer for identifying a subset of the array of pixels that represents edges of local regions of the monoscopic source image, the edges being defined by an image parameter having an estimated value exceeding a predefined threshold, wherein the image parameter represents a transition in luminance, contrast, texture, or color in the monoscopic source image;
   (b) assigning to each pixel within said subset an edge depth value based on the corresponding estimated value of the image parameter;
   (c) generating the depth map for the monoscopic source image based on the edge depth values; and,
   (d) smoothing the entire depth map in both vertical and horizontal orientations using a smoothing filter, wherein range and strength of the smoothing are greater in the vertical than the horizontal orientation;
   wherein step (d) comprises smoothing the depth map to a near-saturation level, so selected as to minimize dis-occluded regions around each edge in a deviated image generated based on the depth map, using a 2D Gaussian filter defined by a window size parameter and a standard deviation parameter that are each larger in the vertical than in the horizontal orientation.

2. The method of claim 1, wherein the depth map is a sparse depth map that is generated in step b) while disregarding regions where no edge is detected so that the subset of pixels, for which the depth values are assigned based on the estimated values of the image parameter, are concentrated at the edges.

3. The method of claim 1, wherein step (a) is performed by the steps of:
   determining from a finite set of scales a minimum reliable scale; and
   estimating gradient magnitude for each pixel of the source image by using the minimum reliable scale; and
   wherein step (b) is performed by the steps of:
   recording the estimated gradient magnitude as the depth value;
   partitioning the total area of the depth map into a plurality of windows of a predetermined size; and
   filling the depth map in regions with missing depth values, by inserting maximum depth values within each window.

4. The method of claim 1, wherein step (a) is performed by applying an operator to the source image to detect location of the edge, the operator having a suitably selected input threshold value to obtain a binary depth value distribution for use by step (b), the input threshold selected from an empirically pre-determined range so as to make the depth map lie between being too barren and too finely textured; and
   wherein step (b) is performed by the steps of:
   amplifying the binary depth value distribution by a predetermined factor; and
   expanding spatial location of each depth value by a predetermined number of pixels to increase width of the identified subset of the array of pixels representing the edge.

5. The method of claim 4, wherein the operator is a Sobel operator and the input threshold range is 0.04 to 0.10.

6. The method of claim 1, further comprising using a depth image based rendering (DIBR) processor to create at least one deviated image by processing the source image based on the depth map, such that the source image and the deviated image form at least one stereoscopic image pair.

7. The method of claim 6, wherein the DIBR processor performs the steps of:
   selecting a value for zero-parallax setting between nearest and farthest clipping planes of the depth map, so selected as to meet viewing preferences;
   providing a depth range value and a corresponding focal length for each stereoscopic image pair; and
   filling each residual vacant spot in the deviated image, by using an average of all neighboring pixels.

8. A method of claim 6, further comprising displaying the at least one stereoscopic image pair on a 3D display.

9. The method of claim 1, further comprising the steps of:
   using a depth image based rendering (DIBR) processor to create a plurality of deviated images by processing the source image based on the depth map; and
   selecting from the source image and the plurality of deviated images more than one stereoscopic image pairs, so as to give an impression of being captured from different camera positions.

10. The method of claim 1 further comprising the step of using a depth image based rendering (DIBR) processor to create at least one deviated image by processing the source image based on the smoothed depth map, such that the source image and the at least one deviated image form at least one stereoscopic image pair.

11. A method of claim 10, further comprising displaying the at least one stereoscopic image pair on a 3D display.

* * * * *